United States Patent [19]

Nehl

[11] Patent Number: 4,830,316
[45] Date of Patent: May 16, 1989

[54] MOUNTING UNIT

[75] Inventor: Wolfgang Nehl, Waldachtal, Fed. Rep. of Germany

[73] Assignee: fischerwerke, Artur Fischer GmbH & Co. KG, Waldachtal, Fed. Rep. of Germany

[21] Appl. No.: 176,022

[22] Filed: Mar. 30, 1988

[30] Foreign Application Priority Data

Apr. 4, 1987 [DE] Fed. Rep. of Germany ....... 3711432

[51] Int. Cl.$^4$ ............................................. G12B 9/00
[52] U.S. Cl. .................................... 248/27.1; 24/458; 24/573; 248/551; 411/551
[58] Field of Search ................... 248/27.1, 27.3, 316.4, 248/551; 411/21, 349, 550, 551; 24/458, 453, 473, 474

[56] References Cited

U.S. PATENT DOCUMENTS

| 843,271 | 2/1907 | Hanlon | 411/21 |
| 2,640,244 | 6/1953 | Becker | 411/551 |
| 2,662,260 | 12/1953 | Marschner | 411/551 |
| 3,574,899 | 4/1971 | Fisher | 248/27.3 X |
| 4,169,624 | 10/1979 | Yefsky et al. | 248/27.1 X |
| 4,354,298 | 10/1982 | Tanaka et al. | 24/453 |
| 4,372,509 | 2/1983 | Krainhöfer | 248/27.1 |
| 4,582,289 | 4/1986 | Gibson et al. | 248/316.4 X |

FOREIGN PATENT DOCUMENTS

| 7134529 | 9/1971 | Fed. Rep. of Germany . |
| 2944862 | 5/1981 | Fed. Rep. of Germany . |
| 3447349 | 7/1985 | Fed. Rep. of Germany . |

Primary Examiner—Ramon O. Ramirez
Attorney, Agent, or Firm—Michael J. Striker

[57] ABSTRACT

A mounting unit for inserting into mounting openings of power vehicles comprises a shield member having a rear side, and a plurality of clamping elements connected with the shield member and fixable to a wall which limits a mounting opening of a power vehicle, each of the clamping elements having a slotted sleeve extending from the rear side of the shield member, a threaded member, and a clamping member extending outwardly beyond the sleeve and longitudinally displaceable in direction toward the shield member in response to rotation of the threaded member.

7 Claims, 2 Drawing Sheets

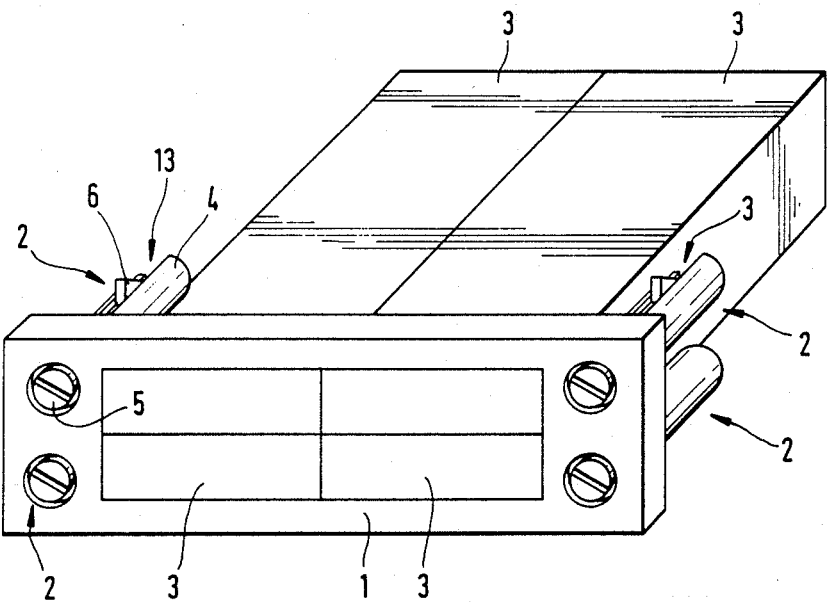
FIG. 1
FIG. 2
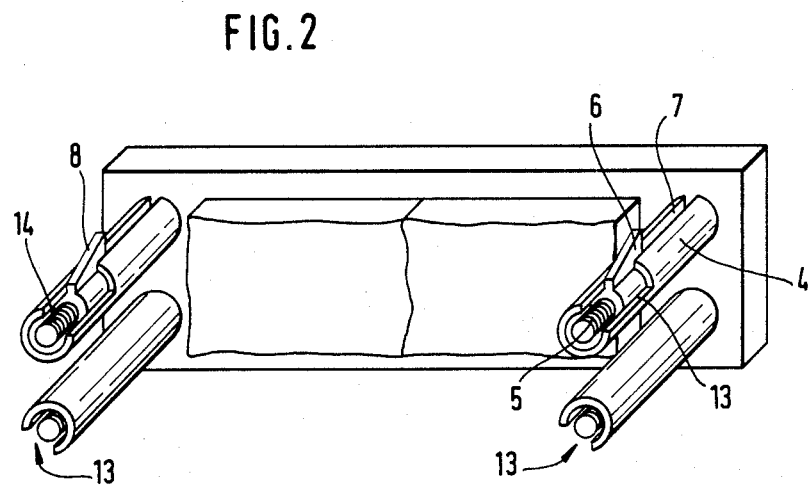

MOUNTING UNIT

BACKGROUND OF THE INVENTION

The present invention relates to a mounting unit for inserting into mounting openings of power vehicles.

Power vehicles are provided with mounting openings in which the mounting unit, for example an auto radio, can be inserted. The known mounting unit includes a shield member which overlaps the edge of the mounting opening at the visible side, and springy clamping elements which engage the wall of the mounting opening. The clamping elements fix the mounting unit in the region of the mounting opening. However, frequently i the conventional mounting units additional connecting points are required, which lie remotely from the mounting opening in the interior of the mounting space. Since the wall thicknesses of the wall which limits the mounting opening can be different in dependence upon the type of the automobile or the automobile manufacturer, it is required with the conventional mounting units to adapt the clamping elements especially to the respective wall thickness. Therefore the known mounting units cannot be used universally.

SUMMARY OF THE INVENTION

Accordingly, it is an object of the present invention to provide a mounting unit which avoids the disadvantages of the prior art.

More particularly, it is an object of the present invention to provide a mounting unit of the above-mentioned type, which can be used as universally as possible, and at the same time can be reliably mounted in mounting openings.

In keeping with these objects and with others which will become apparent hereinafter, one feature of the present invention resides, briefly stated, in a mounting unit having a shield member and a plurality of clamping elements which is fixable in a wall limiting a mounting opening, wherein each clamping element has a slotted sleeve extending from a rear side of the shield member, and a clamping member which extends outwardly beyond the sleeve and is longitudinally displaceable in direction toward the shield member by rotation of a screw.

By means of respectively strong pulling of the screw which has a screw head available from the front side of the shield member, the clamping member can be pressed with a high force against the wall which limits the mounting opening. Thereby, the wall is firmly clamped between the clamping member and the front shield member. With the utilization of such a clamping element in each corner of the shield member of the mounting unit, an extremely stable connection for the mounting unit is obtained. Because of the displaceability of the clamping member along the screwing direction toward the rear side of the shield member, the inventive mounting element can be used for widely differing wall thicknesses.

In accordance with an especially advantageous feature of the present invention, the clamping element is formed as a projection which extends through the slot of the sleeve which surrounds the screw. Such projection is turnable in the recess provided in the sleeve by for example 45°, so that the projection during insertion of the mounting unit can be turned to a position in which the projection is reset against the end of the mounting opening. After the insertion of the rounting unit, the projection is then turned by rotation of the screw to another position, in which the projection extends outwardly beyond the edge of the mounting opening.

The recess which is provided for turning of the projection is arranged for example at the end of the sleeve. The recess can be formed as a significant widening of the slot, which can extend over an angular region of 45°.

Since a sufficient friction to turning of the projection occurs between the clamping element and the screw, it is especially advantageous when the screws are formed as self-tapping screws which engage in an opening of the clamping element composed of a synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a mounting unit for cassette containers, in accordance with the present invention;

FIG. 2 is a rear view of the mounting unit of FIG. 1 in accordance with the present invention, in the region of a shield member.

DESCRIPTION OF THE PREFERRED EMBODIMENTS

Figure 3:
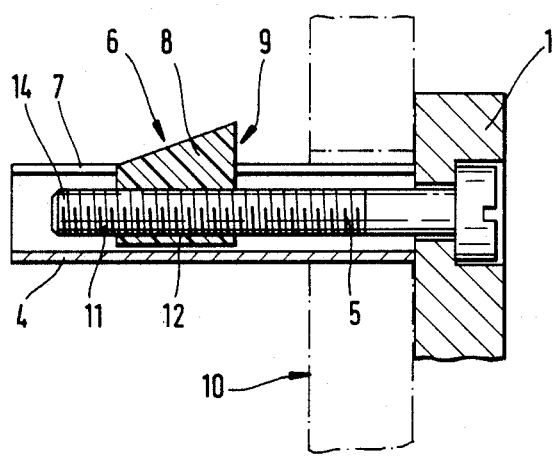
FIG. 3 is a view showing a longitudinal section of the mounting unit in accordance with the present invention, in the region of a clamping element.

A mounting unit in accordance with the present invention as shown in FIG. 1 has a shield member which is identified with reference numeral 1. Four connecting elements 2 extend from a rear side of the shield member 1. Four containers 3 are further provided for receiving cassettes therein.

Each of the connecting elements 2 has a slotted sleeve 4 which extends from the rear side of the shield member 1, a screw 5, and a clamp in element 6.

FIG. 2 and the longitudinal section shown in FIG. 3 illustrate the construction of the mounting elements. Each sleeve 4 has a longitudinal slot 7. A projection 8 of the clamping element 6 extends through the longitudinal slot 7 of the sleeve. Each projection 8 forms a clamping surface 9 which can be pulled in direction of the shield member 1 by turning of the screw 5. This pulling can be performed till the clamping surface 9 abuts against a wall 10 which limits the mounting opening, as illustrated in FIG. 3 in broken lines.

The screws 5 have a thread 11 which is formed as a self-tapping thread screwable into an opening 12 of the clamping element 6. The sleeve 4 is further provided at its projecting end with a recess 13. The recess 13 is formed by a significant widening of the slot 7. The projection 8 can be turned by turning of the screw 5, when it is located in the region of the recess 13. In the shown example, the projection 8 can be turned by an angle of 45° in the region of the recess 13. During insertion of the mounting unit, the clamping element 8 is located at a rear end 14 of the screw 5, so that the projection 8 is turned to the shown perpendicular position and during further turning of the screw 55 engage in the slot 7 in the longitudinal direction toward the shield member 1.

It will be understood that each of the elements described above, or two or more together, may also find a useful application in other types of constructions differing from the types described above.

While the invention has been illustrated and described as embodied in a mounting unit for power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior att, fairly constitute essential characteristics of the generic or specific aspects of this invention.

What is claimed as new and desired to be protected by Letters Patent is set forth in the appended claims.

1. A mounting unit for inserting into mounting openings of power vehicles, comprising a shield member having a rear side; a plurality of clamping elements connected with said shield member and fixable to a wall which limits a mounting opening of a power vehicle, each of said clamping elements having a slotted sleeve extending from said rear side of said shield member, a threaded member, and a clamping member extending outwardly beyond said sleeve and longitudinally displaceable in direction toward said shield member in response to rotation of said threaded member, said clamping member of each of said clamping elements being provided with a projection which has a clamping surface, said sleeve of each of said clamping elements having a slot and a recess which opens into said slot, so that said clamping surface of said projection of said clamping member of each of said clamping elements being turnable into said recess of a respective one of said sleeves in response to turning of said threaded member.

2. A mounting unit as defined in claim 1, wherein said threaded member of each of said clamping elements is formed as a screw.

3. A mounting unit as defined in claim 1, wherein said threaded member has a helical thread, said clamping member with said projection being arranged on said helical thread of said threaded member.

4. A mounting unit as defined in claim 1, wherein each of said sleeves has an end which is spaced from said shield member, said recess being formed at said spaced end of each of said sleeves.

5. A mounting unit as defined in claim 1, wherein said clamping member has an opening, said threaded member being provided with a self-tapping thread engageable into said opening of said clamping member.

6. A mounting unit as defined in claim 1, wherein said clamping member is composed of a synthetic plastic material.

7. A mounting unit as defined in claim 1, wherein said shield member has a plurality of corners, each of said mounting elements being arranged in respective one of said corners of said shield member.

* * * * *